United States Patent [19]
Frank et al.

[11] Patent Number: 5,493,919
[45] Date of Patent: Feb. 27, 1996

[54] FORCE MEASURING SYSTEM

[75] Inventors: Dieter Frank, Hanover; Axel Stender, Hameln, both of Germany

[73] Assignee: WABCO Standard GmbH, Hanover, Germany

[21] Appl. No.: 166,454

[22] Filed: Dec. 13, 1993

[30] Foreign Application Priority Data

Dec. 19, 1992 [DE] Germany .................. 42 43 246.4

[51] Int. Cl.$^6$ .................................................. G01D 9/00
[52] U.S. Cl. ................................. 73/862.041; 73/862.68
[58] Field of Search ............... 73/862.041, 862.042, 73/862.043, 862.621, 862.68

[56] References Cited

U.S. PATENT DOCUMENTS

| | | | |
|---|---|---|---|
| 4,700,566 | 11/1987 | Hafner | 177/DIG. 9 X |
| 5,222,400 | 6/1993 | Hilton | 73/862.043 |
| 5,335,557 | 9/1994 | Yasutake | 73/862.041 X |

FOREIGN PATENT DOCUMENTS

| | | |
|---|---|---|
| 0303827 | 2/1989 | European Pat. Off. . |
| 722579 | 7/1942 | Germany . |
| 2521858 | 11/1976 | Germany . |
| 3440670 | 10/1986 | Germany . |
| 3820680 | 9/1991 | Germany . |

OTHER PUBLICATIONS

8253a Sensors and Actuators–A Physical, A32(1992) Apr., Nos. 1/3, Lausanne, Switzerland pp. 531–538.
A. Romiti and M. Sorle "force and moment measurement on a robotic assembly hand" p. 532, left column, line 10–p. 534, right column, line 14; FIGS. 2–5.

*Primary Examiner*—Richard Chilcot
*Assistant Examiner*—Elizabeth L. Dougherty
*Attorney, Agent, or Firm*—Meltzer, Lippe, Goldstein, Wikf, Schissel & Sazer

[57] ABSTRACT

A force measuring system for measuring first and second forces ($F_1,F_2$) acting on a body along first and second directions of attack ($\alpha,\beta$) comprises first and second force sensors which are disposed at first and second measuring directions ($\gamma,\delta$) with respect to the body, at least the first measuring direction ($\gamma$) differing from the first and second directions of attack ($\alpha,\beta$). The first and second force sensors measure first and second measured forces ($F_{Meas1},F_{Meas2}$) along measuring directions ($\gamma,\beta$). From the first and second measured forces ($F_{Meas1},F_{Meas2}$), the first and second forces ($F_1,F_2$) acting on the body can be calculated.

4 Claims, 1 Drawing Sheet

FORCE MEASURING SYSTEM

BACKGROUND OF INVENTION

The invention relates to a force measuring system having two force measuring sensors for measuring two forces acting on a body.

A force measuring system of this type is mentioned on page 9 of EP 0 303 827 B1. Its force sensors measure a force acting in the vertical direction and a force acting in the horizontal direction on a body. The body upon which these forces act is the articulated coupling of a vehicle train towing vehicle.

It is customary to place such a force measuring system so that the directions of measurement of the force sensors coincide with the directions of attack of the forces or are parallel to same. However, there are applications in which such an arrangement of the force measuring system encounters difficulties, e.g., due to a lack of space.

It is therefore the object of the instant invention to improve a force measuring system of this type by simple means so that problem-free placement of the force sensors is possible.

SUMMARY OF THE INVENTION

This object is attained by means of the present invention which provides a force measuring system for measuring first and second forces acting on a body along first and second directions of attack, comprising first and second force sensors disposed at first and second measuring directions. At least the first measuring direction differs from the first and second directions of attack. In a preferred embodiment, the second measuring direction also differs from the first and second directions of attack. From the forces measured by the force sensors along the measuring directions, the two forces acting on the body can be calculated.

The invention can be used to special advantage in cases where the precision of measurement of the force sensors is low in the lower range of operation, as is usually the case, and where the magnitude of one of the forces fluctuates widely, while the lower limit may very well be zero. In such case, the known force measuring system, wherein the two force sensors coincide with or are parallel to the direction of action of the forces, delivers imprecise measuring results if one of the forces is small. Through the placement of the force measuring system according to the invention, however, the other force, which remains constant or fluctuates less, provides a basic load for both force sensors, so that neither force sensor functions in its range of lesser measuring precision.

The invention can also be used when one of the forces is missing. In this case, the invention measures the remaining force by measuring its components in the measuring direction of the force sensors.

Force sensors which are able to measure only in one direction are often used. In such cases, two force sensors facing each other have previously been used if the force or forces alternate between traction and compression with respect to one force sensor. In such case, the invention makes it possible to leave out the force sensors associated with traction or those associated with compression because of the difference provided between measuring direction and direction or directions of action of the force or forces. The invention thereby offers a simple and low-cost solution.

The force sensors used often function on the principle of measuring expansion or deformation. In such case, the invention makes it possible to evaluate the measured results of the force sensors in the form of expansion or deformation values such as they occur in the directions of measurement.

BRIEF DESCRIPTION OF THE DRAWING

The invention shall now be described by reference to an embodiment shown schematically in FIG. 1.

DETAILED DESCRIPTION OF A PREFERRED EMBODIMENT

Figure 1:
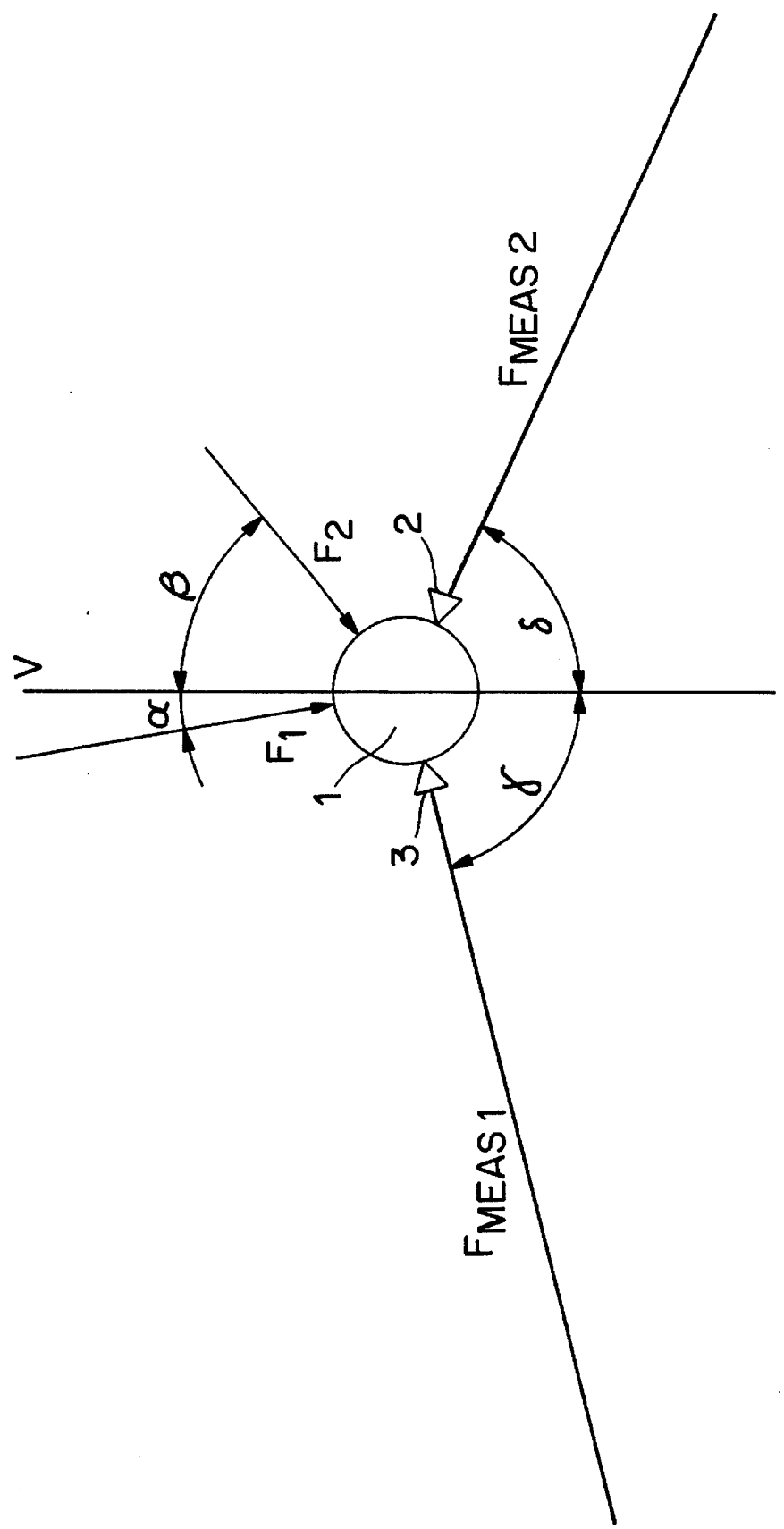

Referring to FIG. 1, two forces $F_1$ and $F_2$ act on a body 1 along directions of attack which are at angles $\alpha$ and $\beta$ with respect to a reference line V—V. Each of the forces $F_1$ and $F_2$ may be the resultant of several forces.

To measure the forces $F_1$ and $F_2$, a force measuring system has two schematically shown force sensors (2 and 3). Each force sensor (2 or 3) may be an individual sensor, but may also consist of several individual sensors. The force sensors (2 and 3) are placed so that their directions of measuring which are defined by the angles $\gamma$ and $\delta$ to the reference line V—V deviate from the directions of attack $\alpha$ and $\beta$ of the forces $F_1$ and $F_2$. The force measured along measuring direction $\delta$ is denoted as $F_{Meas2}$ and the force measured along measuring direction $\gamma$ is denoted as $F_{Meas1}$.

It can be shown that the following equations apply:

$$F_1 = F_{Meas1} \bullet \sin(\beta-\gamma) + F_{Meas2} \bullet \sin(\beta+\delta) / \sin(\alpha+\beta) \quad (I)$$

$$F_2 = F_{Meas1} \bullet \sin(\alpha+\gamma) + F_{Meas2} \bullet \sin(\alpha-\delta) / \sin(\alpha+\beta) \quad (II).$$

If the forces $F_1$ and $F_2$ act perpendicularly with respect to each other so that $\alpha+\beta=90°$, the equations (I) and (II) are simplified as follows:

$$F_1 32 F_{Meas1} \bullet \cos(\gamma+\alpha) + F_{Meas2} \bullet \cos(\delta-\alpha) \quad (III)$$

$$F_2 = F_{Meas1} \bullet \sin(\alpha+\gamma) + F_{Meas2} \bullet \sin(\alpha-\delta) \quad (IV).$$

If the forces $F_1$ and $F_2$ act perpendicularly with respect to each other so that $\alpha+\beta=90°$, and if additionally, the direction of attack of force $F_1$ coincides with the reference line V—V so that $\alpha=0$, then the equations (III) and (IV) are further simplified to:

$$F_1 = F_{Meas1} \bullet \cos\gamma + F_{Meas2} \bullet \cos\delta \quad (V)$$

$$F_2 = F_{Meas1} \bullet \sin\gamma - F_{Meas2} \bullet \sin\delta \quad (VI).$$

In this case it is especially advantageous for the measuring directions $\gamma$ and $\delta$ to be each set at 45°.

Corresponding equations apply if the direction of attack of the force $F_2$ coincides with the reference line V—V, i.e., if $\beta=0$, and the forces $F_1$ and $F_2$ act perpendicularly to each other.

If the measuring direction of the force sensor (3) and the direction of attack of force $F_2$ coincide, or if they are parallel to each other, the following equations apply:

$$F_1 = F_{Meas2} \bullet \sin(\beta+\delta) / \sin(\alpha+\beta) \quad (VII)$$

$$F_2 = F_{Meas1} + F_{Meas2} \bullet \sin(\alpha-\delta) / \sin(\alpha+\beta) \quad (VIII)$$

Corresponding equations apply if the measuring direction of the force sensor (2) and the direction of attack of force $F_1$ coincide or are parallel to each other, so that $\delta=\alpha$.

Based on the equations (I) to (VIII) or on the above-mentioned corresponding equations, the magnitudes of the forces $F_1$ and $F_2$ can be calculated from the measured forces $F_{Meas1}$ and $F_{Meas2}$, for instance by means of an electronic computer which can be appropriately programmed.

In case the force sensors (2 and 3) operate on the principle of expansion or deformation measurement, the measured forces $F_{Meas1}$ and $F_{Meas2}$ can be converted into expansion or deformation values in the measuring directions ($\gamma$ and $\delta$) based on the corresponding characteristics of the force sensors (2 and 3).

All technical areas offer possibilities for the application of such a force measuring system, whereby the reference line V—V is often vertical, as shown also in the embodiment of the example. The automotive industry should be mentioned as a possible area of application where a weight must often be measured as one of the forces ($F_1$ or $F_2$) and a propulsive force, a road resistance, inertia, a braking force or a resultant of such forces must be measured as the other force ($F_2$ or $F_1$). In this case the weight often does not fluctuate or fluctuates relatively little, while the other force often fluctuates widely, for example between zero and a maximum value. The measuring of braking forces on weight-loaded wheels and vehicle connections, such as an articulated coupling should also be mentioned as a special area of application in the automotive industry.

In case one of the forces ($F_1$ or $F_2$) is absent, its direction of attack, i.e., its corresponding angle ($\alpha$ or $\beta$) is not present, and the equations indicated above are simplified accordingly or are left out entirely, if applicable.

While the invention has been described by reference to a specific embodiment, this was for purposes of illustration only. Numerous alternative embodiments will be apparent to those skilled in the art and are considered to be within the scope of the invention.

We claim:

1. A force measuring system for simultaneously measuring a first force ($F_1$) acting on a body along a first direction of attack which is at a first angle ($\alpha$) with respect to a reference line (V—V) and a second force ($F_2$) acting on said body along a second direction of attack which is at a second angle ($\beta$) with respect to said reference line (V—V) comprising first and second force measuring sensors disposed along first and second measuring directions which simultaneously measure first and second measured forces ($F_{Meas1}$, $F_{Meas2}$) along said first and said second measuring directions, wherein at least said first measuring direction is at an angle ($\gamma$ or $\delta$) with respect to said reference line (V—V) which differs from said angles ($\alpha$, $\beta$) of said directions of attack.

2. The force measuring system of claim 1, wherein said second measuring direction is at an angle ($\delta$ or $\gamma$) with respect to said reference line (V—V) which also differs from said angles ($\alpha$, $\beta$) of said directions of attack.

3. A method for simultaneously measuring a first force ($F_1$) acting on a body along a first direction of attack which is at a first angle ($\alpha$) with respect to a reference line (V—V) and a second force ($F_2$) acting on said body along a second direction of attack which is at a second angle ($\beta$) with respect to said reference line (V—V) comprising placing first and second force measuring sensors along first and second measuring directions, simultaneously measuring first and second measured forces ($F_{Meas1}$, $F_{Meas2}$) along said first and second measuring directions respectively, and calculating said first and second forces ($F_1$ and $F_2$) acting on said body from said first and second measured forces ($F_{Meas1}$, $F_{Meas2}$), wherein at least said first measuring direction is at an angle ($\gamma$ or $\delta$) with respect to said reference line (V—V) which differs from said angles (60, $\beta$) of said directions of attack.

4. The method of claim 3 wherein said second measuring direction is at an angle ($\delta$ or $\gamma$) with respect to said reference line (V—V) which also differs from said angles ($\alpha$, $\beta$) of said directions of attack.

\* \* \* \* \*